United States Patent
Tanaka et al.

(10) Patent No.: US 11,146,764 B2
(45) Date of Patent: Oct. 12, 2021

(54) CONTROL DEVICE, OPTICAL SCANNING DEVICE, DISPLAY APPARATUS, AND CONTROL METHOD

(71) Applicants: Toyoki Tanaka, Tokyo (JP); Etsuji Hayakawa, Tokyo (JP)

(72) Inventors: Toyoki Tanaka, Tokyo (JP); Etsuji Hayakawa, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 24 days.

(21) Appl. No.: 16/808,867

(22) Filed: Mar. 4, 2020

(65) Prior Publication Data

US 2020/0296337 A1 Sep. 17, 2020

(30) Foreign Application Priority Data

Mar. 12, 2019 (JP) .............................. JP2019-045075

(51) Int. Cl.
*H04N 9/31* (2006.01)
*H04N 9/64* (2006.01)

(52) U.S. Cl.
CPC ......... *H04N 9/3135* (2013.01); *H04N 9/3179* (2013.01); *H04N 9/645* (2013.01)

(58) Field of Classification Search
CPC .... H04N 9/3135; H04N 9/3179; H04N 9/645; H04N 9/3161; H04N 9/3194; H04N 9/3164; G09G 3/02; G09G 3/346; G02B 26/10; G02B 26/105

See application file for complete search history.

(56) References Cited

U.S. PATENT DOCUMENTS

| | | | |
|---|---|---|---|
| 2006/0221021 A1* | 10/2006 | Hajjar | H04N 9/3155 345/84 |
| 2007/0132674 A1* | 6/2007 | Tsuge | G09G 3/3283 345/77 |
| 2010/0265278 A1* | 10/2010 | Nishioka | H01S 5/042 345/690 |
| 2019/0157839 A1* | 5/2019 | Gudaitis | H04N 9/3161 |

FOREIGN PATENT DOCUMENTS

JP 2010-205445 9/2010

* cited by examiner

*Primary Examiner* — Michael E Teitelbaum
(74) *Attorney, Agent, or Firm* — IPUSA, PLLC

(57) ABSTRACT

A control device for a laser scanning display apparatus includes a laser device, a current source that generates an electric current supplied to the laser device, and a controller that controls the current source to set a current value of the electric current supplied to the laser device. During a period for scanning a non-display area where no image is displayed, the controller sets the current value at a first drive current value that is less than a threshold current value at which the laser device starts oscillating; and during a period for scanning a portion with a luminance level of zero in a display area where an image is displayed, the controller sets the current value at a second drive current value that is greater than or equal to the first drive current value and less than the threshold current value.

5 Claims, 8 Drawing Sheets

CONTROL DEVICE, OPTICAL SCANNING DEVICE, DISPLAY APPARATUS, AND CONTROL METHOD

CROSS-REFERENCE TO RELATED APPLICATION

The present application is based upon and claims priority to Japanese Patent Application No. 2019-045075, filed on Mar. 12, 2019, the entire contents of which are incorporated herein by reference.

BACKGROUND OF THE INVENTION

1. Field of the Invention

An aspect of this disclosure relates to a control device, an optical scanning device, a display apparatus, and a control method.

2. Description of the Related Art

FIG. 1 is a graph illustrating an example of a relationship between a drive current I supplied to a laser device such as a laser diode (LD) and an optical power P of the laser device (so-called I-L characteristics). The optical power P in a spontaneous light emission region A1, where the laser device spontaneously emits light (spontaneous emission), gradually increases as the drive current I increases. When the drive current I reaches a threshold current value $I_{th}$, laser oscillation (stimulated emission) starts; and compared with the increase in the spontaneous light emission region A1, the optical power P in an oscillation region A2, where the laser device oscillates, increases sharply as the drive current I increases.

For example, Japanese Laid-Open Patent Publication No. 2010-205445 describes a scanning projector including a first current source that supplies a threshold current value $I_{th}$, and a second current source that supplies a gradation current value (a current value obtained by subtracting the threshold current value $I_{th}$ from a drive current value $I_1$ for outputting an optical power value $P_1$) to be added to the threshold current value $I_{th}$.

Thus, in the scanning projector described in Japanese Laid-Open Patent Publication No. 2010-205445, the sum of the threshold current value $I_{th}$ and the gradation current value is applied to a laser device during a period for scanning a display area where an image is displayed.

However, as illustrated in FIG. 2, when a current at the threshold current value $I_{th}$ generated by the first current source is applied to the laser device during a period for scanning a non-display area B1 where no image is displayed, the laser device emits light at an optical power value $P_0$, and the non-display area B1 becomes slightly bright. To prevent this problem, the current supplied to the laser device may be set at zero during the period for scanning the non-display area B1.

On the other hand, during a period for scanning a display area B2 where an image is displayed, to increase the contrast of the image, the current may be set at zero when scanning a portion of the display area B2 where the luminance level is zero, and the current may be set at a value greater than or equal to the threshold current value $I_{th}$ when scanning a non-zero portion of the display area B2 where the luminance level is not zero.

However, when the current is increased from zero to a value greater than or equal to the threshold current value $I_{th}$ to start scanning the portion where the luminance level is not zero, a rise time Tr of the laser output becomes long as illustrated in FIG. 3, and an overshoot may occur. In FIG. 3, the portion exceeding 100%, which is the target output, is the overshoot. The overshoot occurs when the current of the laser device changes across the threshold current value $I_{th}$.

When such overshoot occurs, the image becomes brighter than a target value and is degraded in a portion where the overshoot occurs. The influence of the increase in luminance becomes prominent particularly when the current of the laser device is close to the threshold current value $I_{th}$. For example, when zero-luminance pixels and non-zero luminance pixels are sparsely distributed in an image, an overshoot may occur and cause granular noise in a dark portion of the image.

SUMMARY OF THE INVENTION

In an aspect of this disclosure, there is provided a control device for a laser scanning display apparatus. The control device includes a laser device, a current source that generates an electric current supplied to the laser device, and a controller that controls the current source to set a current value of the electric current supplied to the laser device. During a period for scanning a non-display area where no image is displayed, the controller sets the current value at a first drive current value that is less than a threshold current value at which the laser device starts oscillating; and during a period for scanning a portion with a luminance level of zero in a display area where an image is displayed, the controller sets the current value at a second drive current value that is greater than or equal to the first drive current value and less than the threshold current value.

DESCRIPTION OF THE PREFERRED EMBODIMENTS

Embodiments of the present invention are described below with reference to the accompanying drawings. Throughout the accompanying drawings, the same reference number is assigned to the same component, and repeated descriptions of the same component may be omitted.

First Embodiment

Figure 1:
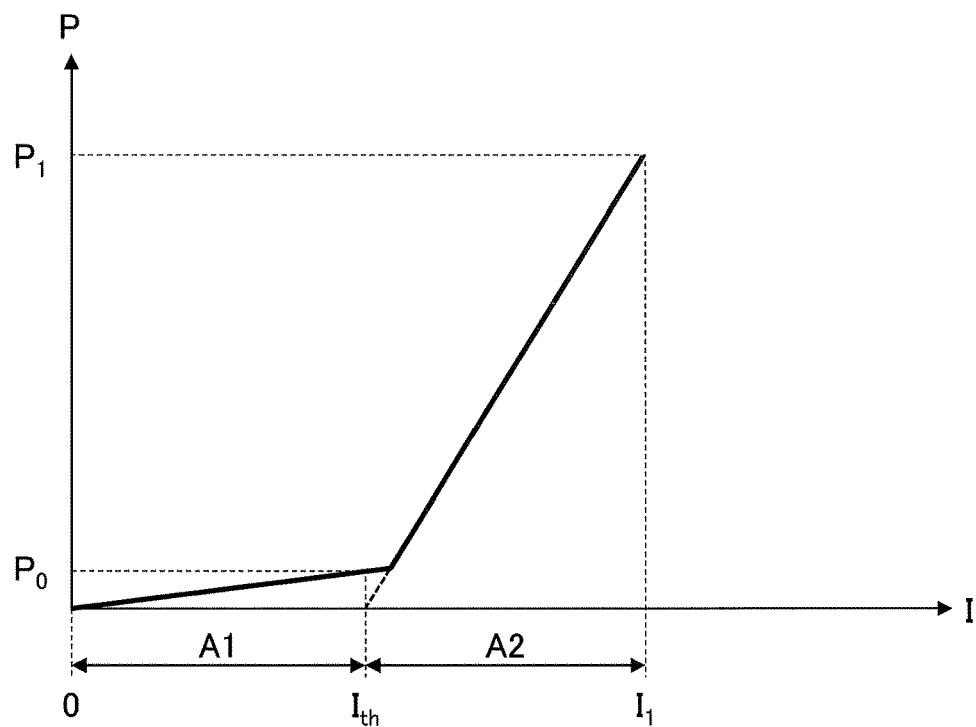
FIG. 1 is a graph illustrating an example of a relationship between a drive current supplied to a laser device and an optical power of the laser device (so-called I-L characteristics)
Figure 2:
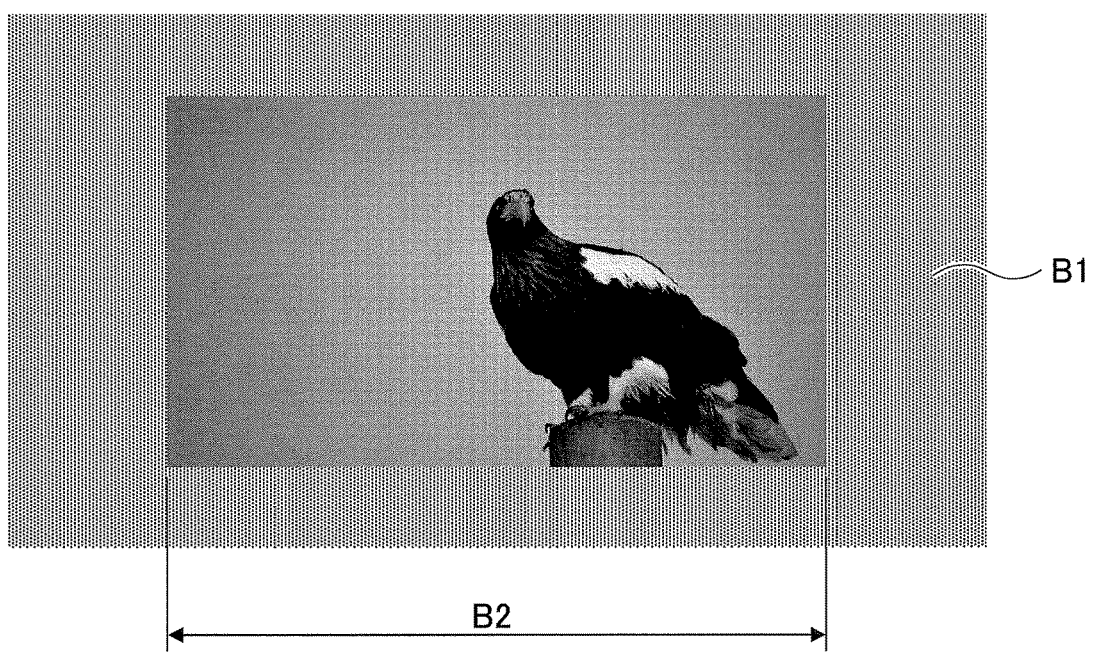
FIG. 2 is a drawing illustrating an example in which a non-display area emits light.
Figure 3:
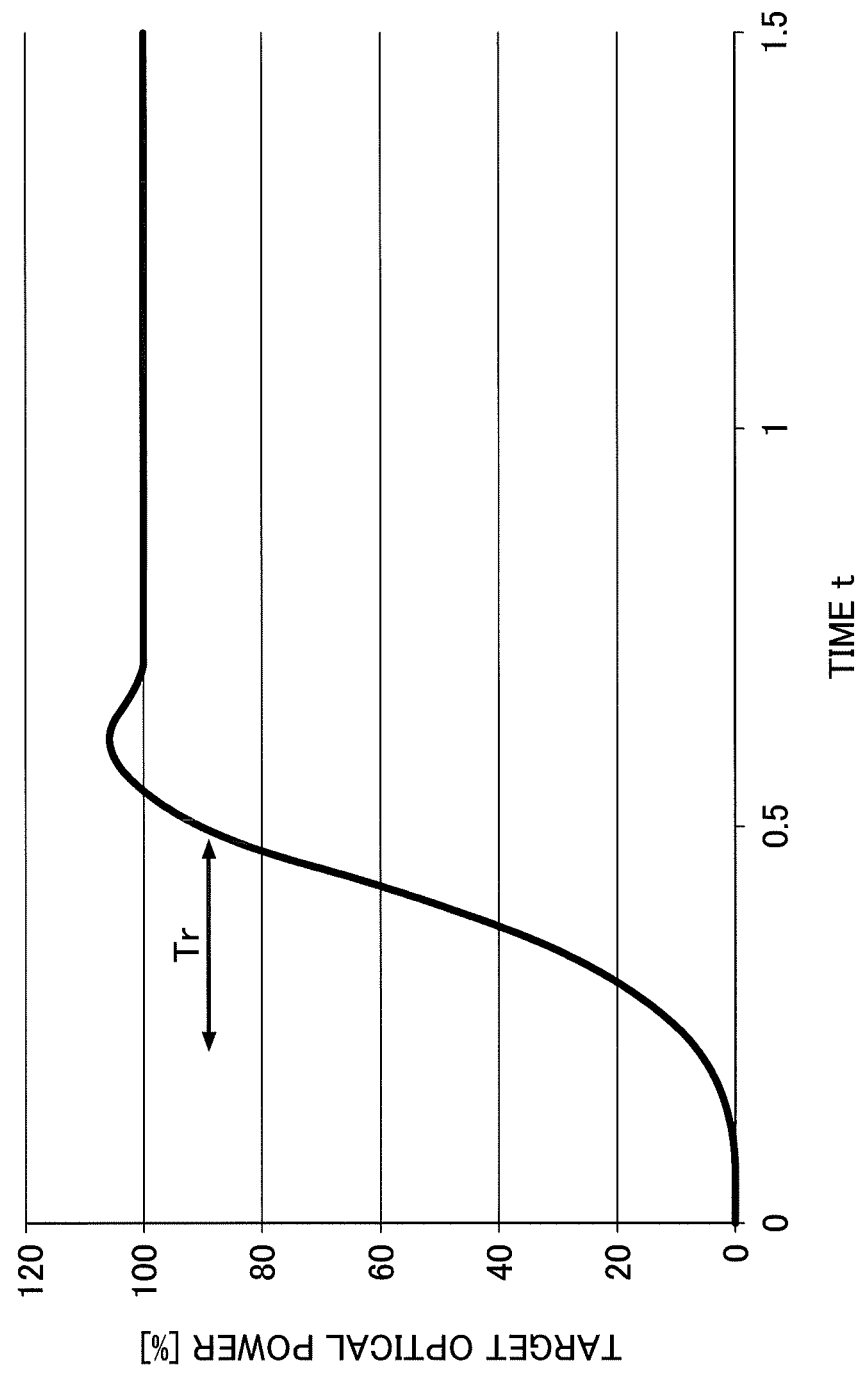
FIG. 3 is a graph illustrating an example of a transient characteristic of an optical power of a laser device.
Figure 4:
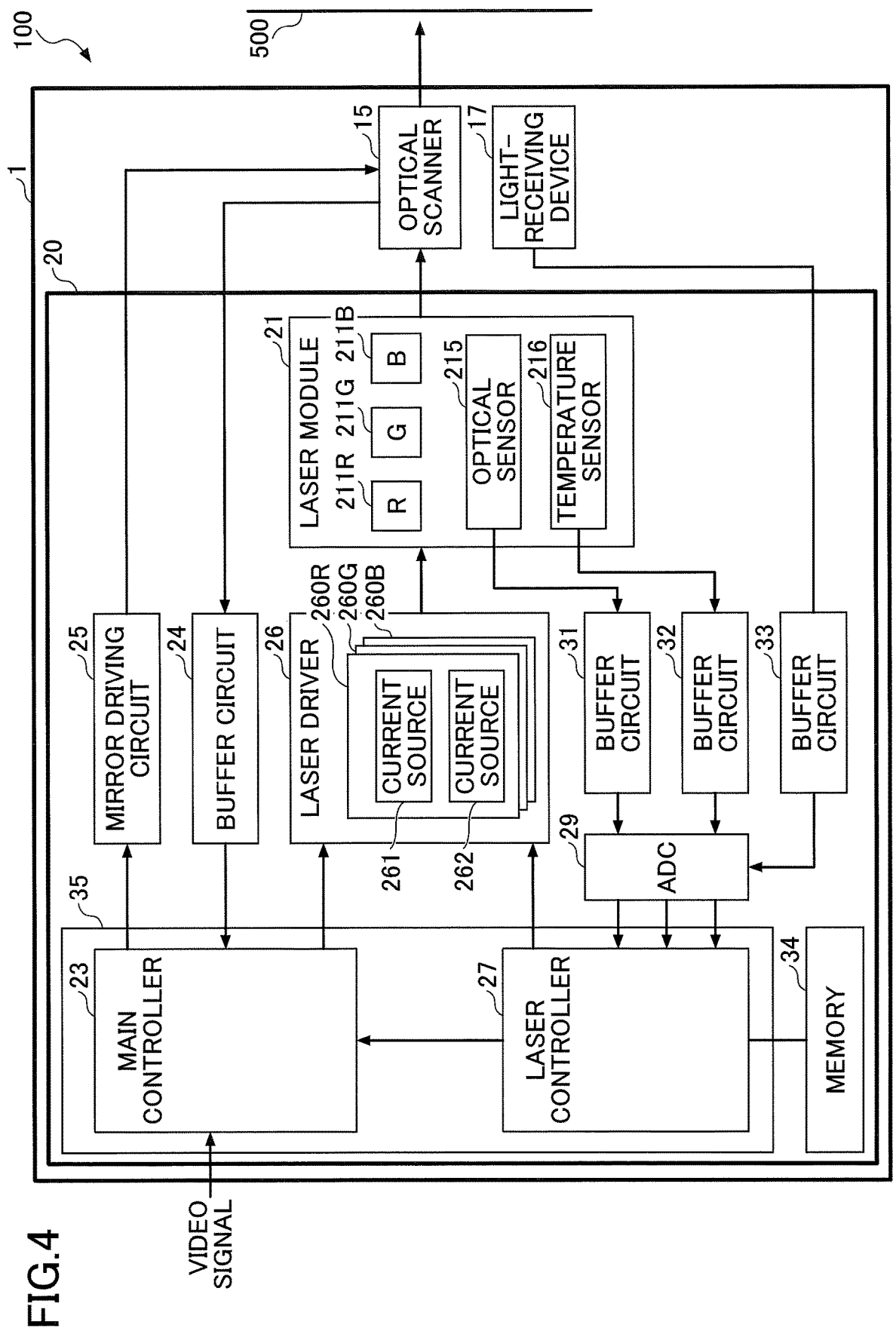
FIG. 4 is a drawing illustrating an example of a configuration of a display apparatus according to a first embodiment.

FIG. 4 is a drawing illustrating an example of a configuration of a laser-scanning display apparatus 100 according to a first embodiment. The display apparatus 100 illustrated in FIG. 4 displays an image corresponding to a video signal input from an external device. Examples of the display apparatus 100 include a head-mounted display that directly projects an image onto the retina of a user's eye, a laser projector that displays an image on a display surface such as a screen, and an in-vehicle head-up.

The display apparatus 100 includes, for example, an optical scanning device 1 and an optical system 500. In the optical scanning device 1, an optical scanner 15 scans a laser beam output from a control device 20 and outputs the laser beam to the optical system 500.

The optical system 500 displays an image according to the laser beam scanned and output by the optical scanner 15. The optical system 500 may include lenses and half mirrors, but may include optical components other than lenses and half mirrors.

The optical scanning device 1 includes, for example, a light-receiving device 17, the optical scanner 15, and the control device 20.

The light-receiving device 17 is an optical sensor that detects external light around the display apparatus 100, and outputs an electric current corresponding to the luminance of the external light. The light-receiving device 17 may be implemented by, for example, a photodiode.

The optical scanner 15 two-dimensionally scans an incoming laser beam, and the scanned laser beam is directly projected onto a display surface via the optical system 500 to form a two-dimensional image. The optical scanner 15 scans a laser beam output from a laser device of the control device 20 by rotating a mirror.

The optical scanner 15 includes, for example, one mirror that rotates (or oscillates) about two orthogonal axes. The optical scanner 15 may be implemented by, for example, a microelectromechanical system (MEMS) produced by a semiconductor process. The mirror in the optical scanner 15 may be driven by, for example, an actuator that uses a deformation force of a piezoelectric element as a driving force.

The control device 20 includes, for example, a laser module 21, buffer circuits 31-33, an analog-to-digital converter (ADC) 29, a controller 35, a buffer circuit 24, a mirror driving circuit 25, a laser driver 26, and a memory 34. The controller 35 includes a main controller 23 and a laser controller 27.

The laser module 21 includes multiple laser devices such as lasers 211R, 211G, and 211B, an optical sensor 215 that monitors light received directly from each of the laser devices, and a temperature sensor 216 that monitors the temperature of (or an ambient temperature around) each of the laser devices.

Each of the lasers 211R, 211G, and 211B emits a laser beam with an optical power corresponding to the current value of an input electric current. The laser 211R is, for example, a red semiconductor laser that emits light with a wavelength $\lambda R$ (e.g., 640 nm). The laser 211G is, for example, a green semiconductor laser that emits light with a wavelength $\lambda G$ (e.g., 530 nm). The laser 211B is, for example, a blue semiconductor laser that emits light with a wavelength $\lambda B$ (e.g., 445 nm). Laser beams with different wavelengths emitted from the lasers 211R, 211G, and 211B are converted into substantially parallel laser beams by, for example, a collimating lens and combined by, for example, a dichroic mirror; and the combined laser beams enter the optical scanner 15.

The optical sensor 215 monitors light received directly from each of the lasers 211R, 211G, and 211B. The optical sensor 215 detects the optical power of each of the lasers 211R, 211G, and 211B, and outputs an electric current corresponding to the magnitude of the detected optical power. The optical sensor 215 may be implemented by, for example, a light-receiving device such as a photodiode. The optical sensor 215 may be disposed in any position where the optical sensor 215 can detect a laser beam before entering the optical scanner 15.

When a neutral density filter, which reduces the amount of light, exists between the laser module 21 and the optical scanner 15, the laser beams with different wavelengths emitted from the lasers 211R, 211G, and 211B are converted into substantially parallel beams by, for example, a collimating lens and combined by, for example, a dichroic mirror, and the combined laser beams enter the neutral density filter. In this case, the optical sensor 215 may be disposed in any position where the optical sensor 215 can detect a laser beam before passing through the neutral density filter.

The temperature sensor 216 monitors the temperature of each of the lasers 211R, 211G, and 211B. The temperature sensor 216 detects the temperature of each of the lasers 211R, 211G, and 211B, and outputs an electric current corresponding to the detected temperature. The temperature sensor 216 may be implemented by, for example, a variable resistance element such as a thermistor. The temperature sensor 216 may include multiple temperature sensing elements provided for the respective lasers 211R, 211G, and 211B, or may include one temperature sensing element that is common to the lasers 211R, 211G, and 211B.

The buffer circuit 31 converts an electric current output from the optical sensor 215 into a voltage and outputs the voltage to the ADC 29. The buffer circuit 32 converts an electric current output from the temperature sensor 216 into a voltage and outputs the voltage to the ADC 29. The buffer circuit 33 converts an electric current output from the light-receiving device 17 into a voltage and outputs the voltage to the ADC 29.

The ADC 29 is an analog-to-digital converter that converts analog voltages output from the buffer circuits 31-33 into digital values and outputs the digital values to the laser controller 27.

The main controller 23 can control, for example, the tilt angle of a mirror (not shown) of the optical scanner 15. For example, the main controller 23 monitors, via the buffer circuit 24, the horizontal and vertical tilt angles of the mirror obtained by a horizontal displacement sensor (not shown) and a vertical displacement sensor (not shown) of the optical scanner 15, and provides an angle control signal to the mirror driving circuit 25. The mirror driving circuit 25 drives (scans) the mirror of the optical scanner 15 to a given angle based on the angle control signal from the main controller 23.

Also, the main controller 23 supplies a drive signal corresponding to, for example, a digital video signal input from an external device outside of the control device 20 to the laser driver 26. The main controller 23 performs a process for separating a synchronization signal from a luminance signal and a chrominance signal included in an input video signal. The main controller 23 supplies, to the laser driver 26, a drive signal according to the luminance signal, the chrominance signal, and a correction signal that is received from the laser controller 27. An angle control signal for rotating the mirror of the optical scanner 15 is generated by the main controller 23 using the synchronization signal. Here, the external device outside of the control device 20 is, for example, a personal computer or a camera module.

The laser driver 26 is a circuit that supplies an electric current to each of the lasers 211R, 211G, and 211B of the laser module 21 based on the drive signal from the main controller 23. With this configuration, the lasers 211R, 211G, and 211B emit red light, green light, and blue light modulated according to the video signal. A color image corresponding to the digital video signal input from an external device outside of the control device 20 can be formed by combining the red light, the green light, and the blue light.

The laser driver 26 includes multiple current source circuits that supply drive currents to multiple laser devices and thereby drive the laser devices. In the present embodiment, the laser driver 26 includes three current source circuits 260R, 260G, and 260B corresponding to the three lasers 211R, 211G, and 211B. The current source circuit 260R supplies, to the laser 211R, a drive current whose current value is adjustable. The current source circuit 260G supplies, to the laser 211G, a drive current whose current value is adjustable. The current source circuit 260B supplies, to the laser 211B, a drive current whose current value is adjustable.

In the present embodiment, a current source circuit is provided for each of the three laser devices. However, the number of current source circuits may be different from the number of laser devices. For example, when more than three laser devices, e.g., two laser devices for each color, are provided, one common current source circuit may be used to drive the two laser devices.

Each of the current source circuits 260R, 260G, and 260B preferably includes at least two current sources 261 and 262. The first current source 261 supplies, to the corresponding laser device, an electric current whose current value has been adjusted based on a current control signal from the laser controller 27. The second current source 262 supplies, to the corresponding laser device, an electric current whose current value has been adjusted based on a drive signal from the main controller 23.

A drive current $I_R$ supplied to the laser 211R is generated by adding an electric current generated by the first current source 261 of the current source circuit 260R to an electric current generated by the second current source 262 of the current source circuit 260R. The same applies to a drive current $I_G$ supplied to the laser 211G and a drive current $I_B$ supplied to the laser 211B.

An output (a detection value of luminance of external light) from the light-receiving device 17 is input to the laser controller 27 via, for example, a transmission cable. The laser controller 27 controls the luminance of an image viewed by the user by increasing or decreasing the current value supplied to each of the lasers 211R, 211G, and 211B based on the output from the light-receiving device 17.

Specifically, the laser controller 27 monitors the luminance of external light around the display apparatus 100 based on an output from the light-receiving device 17, and supplies a current control signal to the laser driver 26 based on the monitored luminance of the external light to increase or decrease the current value of each of the lasers 211R, 211G, and 211B.

The laser controller 27 can also monitor the optical power of light output directly from each of the lasers 211R, 211G, and 211B based on an output from the optical sensor 215, and supply a current control signal to the laser driver 26. The electric current supplied to each of the lasers 211R, 211G, and 211B is controlled based on a current control signal from the laser controller 27 so that an optical power with a predetermined optical power value is output. For example, the predetermined optical power value is a target value determined based on the output from the light-receiving device 17, and a feedback control is performed based on a deviation from the determined target value, which is detected based on the output from the optical sensor 215. The laser controller 27 generates a correction signal for correcting, for example, a gain according to a difference between the optical power value detected by the optical sensor 215 and the predetermined optical power value, and supplies the correction signal to the main controller 23.

The optical sensor 215 may be configured to include three sensors that independently detect light beams emitted from the lasers 211R, 211G, and 211B. Alternatively, the optical sensor 215 may be composed of only one sensor. In this case, the lasers 211R, 211G, and 211B are caused to emit light beams sequentially, and the laser beams are detected sequentially with one sensor to control light emitted from the lasers 211R, 211G, and 211B.

The laser beams output from the laser module 21 enter the mirror of the optical scanner 15 and are scanned by the mirror. The laser beams scanned by the mirror of the optical scanner 15 are directly projected onto the display surface by the optical system 500 to form an image, and the user can view the image with predetermined luminance. The display apparatus 100 may be configured such that the laser beams output from the laser module 21 directly enter the mirror, enter the mirror via an optical fiber, or are guided to the mirror via optical components.

The laser controller 27 may also be connected to the main controller 23, the buffer circuit 24, the mirror driving circuit 25, and the laser driver 26, and may be configured to perform initial setting (e.g., setting of ranges of voltage values to be output) of these components.

Figure 5:
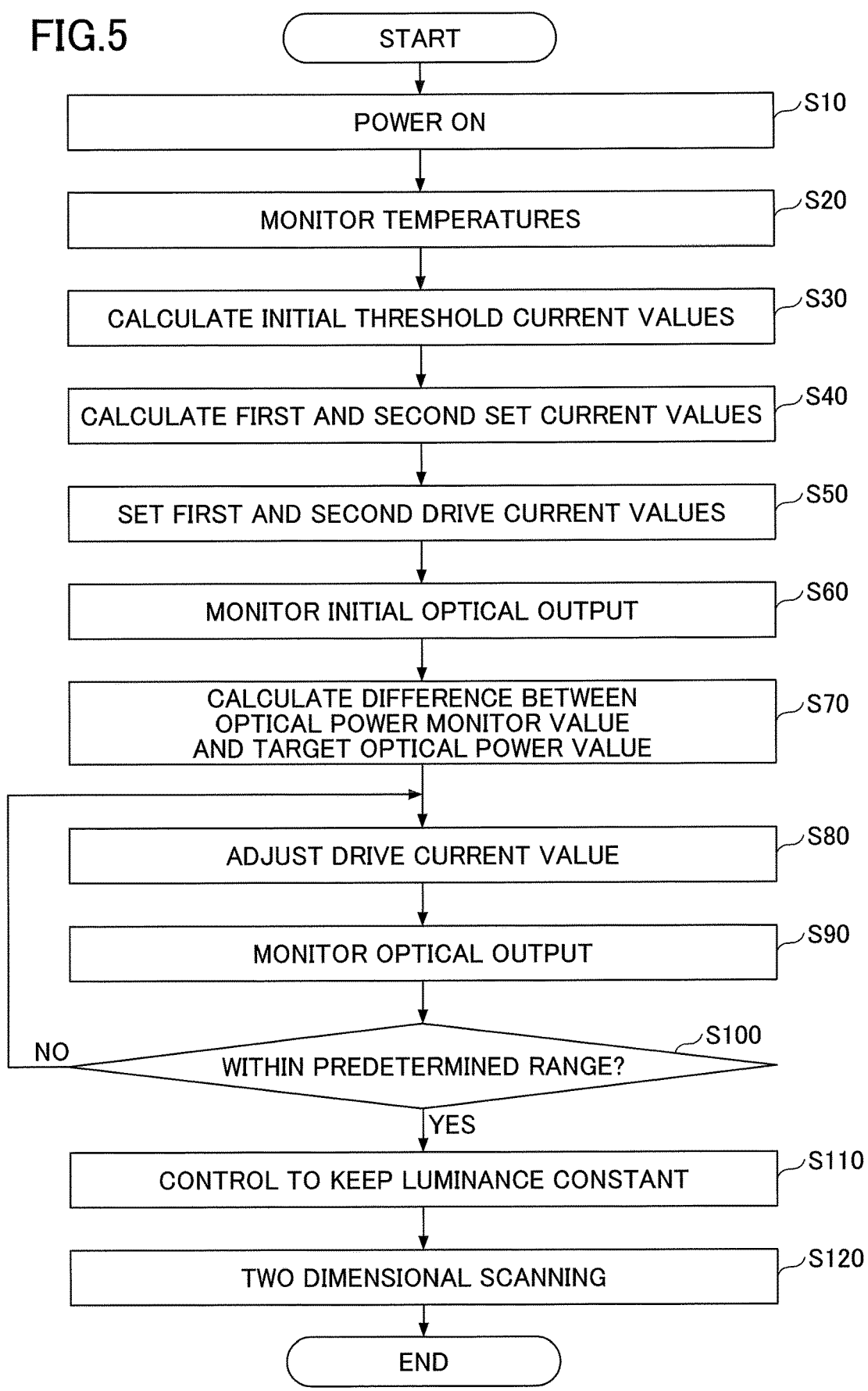
FIG. 5 is a flowchart illustrating an example of a control method according to the first embodiment.

FIG. 5 is a flowchart illustrating an example of a control method according to the first embodiment. The control method illustrated in FIG. 5 is executed by the controller 35 (the laser controller 27 and the main controller 23) of the control device 20 of the display apparatus 100.

At step S10, the control device 20 is powered on and started.

At step S20, immediately after the control device 20 is started, the laser controller 27 monitors the temperatures of the lasers 211R, 211G, and 211B using the temperature sensor 216 and obtains monitored temperature values. That is, the laser controller 27 obtains monitored values of the temperatures of the lasers 211R, 211G, and 211B detected by the temperature sensor 216 before starting to drive the lasers 211R, 211G, and 211B.

At step S30, the laser controller 27 determines the initial value of a threshold current value $I_{th}$, at which the oscillation of the laser 211R starts, according to the temperature of the laser 211R detected by the temperature sensor 216 at step S20. Similarly, the laser controller 27 determines the initial value of a threshold current value $I_{th}$, at which the oscillation of the laser 211G starts, according to the temperature of the laser 211G detected by the temperature sensor 216 at step S20. Similarly, the laser controller 27 determines the initial value of a threshold current value $I_{th}$, at which the oscillation of the laser 211B starts, according to the temperature of the laser 211B detected by the temperature sensor 216 at step S20.

For example, the laser controller 27 determines an initial threshold current value $I_{tho}$ based on temperature characteristic data Dc of the initial value of the threshold current value $I_{th}$ (the initial threshold current value $I_{tho}$) at which the oscillation of a laser device starts and the temperature of the laser device detected by the temperature sensor 216. Based on the temperature characteristic data Dc of the initial threshold current value $I_{tho}$ at which the oscillation of the laser device starts, the laser controller 27 can determine an electric current corresponding to the monitored temperature value obtained at step S20 as the initial threshold current value $I_{tho}$.

The temperature characteristic data Dc of the initial threshold current value $I_{tho}$ defines the relationship between a temperature T of each laser device and the initial threshold current value $I_{tho}$. For example, the temperature characteristic data Dc is stored beforehand in the memory 34 in a readable form.

The memory 34 is preferably a rewritable memory. Even if the optical power characteristics of laser devices change due to, for example, age deterioration, the initial threshold current values $I_{tho}$ of the laser devices can be accurately determined by updating the temperature characteristic data Dc stored in the memory 34.

The temperature characteristic data Dc stored in advance in the memory 34 may be map data (table data) defining initial threshold current values $I_{tho}$ associated with temperatures of the laser device, or coefficient data indicating coefficients in an arithmetic expression for calculating the initial threshold current value $I_{tho}$ based on the temperature T of the laser device.

For example, when the arithmetic expression for calculating the initial threshold current value $I_{tho}$ based on the temperature T of the laser device is a linear function represented by "$I_{tho}=a \times T+b$", data indicating temperature correction coefficients a and b are stored in the memory 34 in advance. The laser controller 27 reads the data of the temperature correction coefficients a and b from the memory 34, and assigns the monitored temperature value obtained at step S20 to the temperature T in the linear function to calculate an initial threshold current value $I_{tho}$ corresponding to the monitored temperature value. The arithmetic expression may also be a polynomial function represented by a polynomial of degree two or more or any other type of function.

At step S40, to reduce the optical power value at the initial threshold current value $I_{tho}$ and suppress the luminance in the non-display area B1, the laser controller 27 calculates a first set current value $I_{S1}$ that is (1/n) times as large as the initial threshold current value $I_{tho}$. Here, "n" is a number greater than one. Also, at step S40, the laser controller 27 calculates a second set current value $I_{S2}$ that is greater than or equal to zero and less than a value that is (1−1/n) times as large as the initial threshold current value $I_{tho}$.

That is, the first set current value $I_{S1}$ and the second set current value $I_{se}$ satisfy formulas (1) and (2) below.

$$I_{S1}=(1/n) \times I_{tho} \quad (1)$$

$$0 \leq I_{S2} < (1-1/n) \times I_{tho} \quad (2)$$

For example, the laser controller 27 sets the second set current value $I_{S2}$ at a value between the first set current value $I_{S1}$ and the value that is (1−1/n) times as large as the initial threshold current value $I_{tho}$, i.e., a value (average value) represented by formula (3) below.

$$I_{S2}=(1-1/n)/2 \times I_{tho} \quad (3)$$

At step S50, the laser controller 27 sets the first set current value $I_{S1}$ as a first drive current value $I_1$, calculates a sum of the first set current value $I_{S1}$ and the second set current value $I_{S2}$, and sets the sum as a second drive current value $I_2$. The laser controller 27 supplies the second set current value $I_{S2}$ to the main controller 23.

The first drive current value $I_1$ is a current value supplied to the laser device when scanning the non-display area B1 different from the display area B2 where an image is to be displayed by the display apparatus 100. The second drive current value $I_2$ is a current value supplied to the laser device when scanning a portion of the display area B2 with a luminance level of zero.

Also, at step S50, the laser controller 27 and the main controller 23 cause the laser driver 26 to start (raise) the drive current supplied to each laser device from the first drive current value $I_1$. For example, the laser controller 27 and the main controller 23 controls the current sources 261 and 262 such that the drive current supplied from the laser driver 26 to each laser device starts from the first drive current value $I_1$. Here, a current value supplied by the first current source 261 is set at the first set current value $I_{S1}$, and the current value supplied by the second current source 262 is set at zero.

The laser controller 27 and the main controller 23 cause each laser device to start oscillation and light emission by controlling the laser driver 26 to start driving the laser device from the first drive current value $I_1$.

This light emission is performed in the non-display area B1 where no image is displayed. For example, the laser controller 27 and the main controller 23 supply the first drive current value $I_1$ to each laser device to display light (reference light) emitted from the laser device in the non-display area B1 located in at least one of the upper, lower, right, and left areas outside of the display area B2.

At step S60, the laser controller 27 monitors an output of the optical sensor 215 receiving the reference light, and obtains optical power monitor values of the laser devices. That is, after causing the drive current to start from the first drive current value $I_1$, the laser controller 27 obtains optical power monitor values of the respective laser devices by monitoring outputs from the optical sensor 215.

At step S70, the laser controller 27 compares the optical power monitor value, which is obtained for each laser device at step S50 immediately after starting driving the laser device with the first drive current value $I_1$, with a predetermined target optical power value Pt to calculate a difference between these values.

At step S80, the laser controller 27 adjusts the drive current value supplied by the laser driver 26 to the laser device such that the difference decreases. At this step, the laser controller 27 adjusts the electric current supplied by the first current source 261. Alternatively, the laser controller 27 may be configured to adjust the electric current supplied by the second current source 262 according to an instruction from the main controller 23. At step S90, the laser controller 27 obtains an optical power monitor value of each laser device by monitoring an electric current output from the optical sensor 215 when the laser device is driven with the drive current value adjusted at step S80. At step S100, the laser controller 27 determines whether a difference Δ between the optical power monitor value obtained at step S80 and the predetermined target optical power value Pt has fallen within a predetermined range. When it is determined that the difference Δ has not fallen within the predetermined range, the laser controller 27 readjusts the drive current value to reduce the difference Δ (step S80). Then, the laser controller 27 obtains an optical power monitor value of the laser device driven with the drive current value readjusted at step S80 (step S90), and performs the determination step S100.

That is, after starting the drive current of each laser device from the first drive current value $I_1$, the laser controller 27 controls the drive current of the laser device to reduce the difference between the optical power monitor value of the laser device, which is obtained by monitoring the output of the optical sensor 215, and the target optical power value Pt. Then, the laser controller 27 repeats steps S80 through S100 until the difference falls within the predetermined range. For example, the laser controller 27 performs such a repetition process according to a PI control or PID control method (P: Proportional, I: Integral, D: Differential).

When it is determined at step S100 that the difference Δ between the optical power monitor value obtained at step S90 and the predetermined target optical power value Pt has fallen within the predetermined range, the laser controller 27 proceeds to step S110.

At step S110, when the difference Δ has fallen within the predetermined range, the laser controller 27 controls the drive current of the laser device based on an output of the light-receiving device 17 for detecting external light around the display apparatus 100 so that the luminance of an image displayed by the display apparatus 100 becomes constant.

At subsequent step S120, the laser controller 27 starts two-dimensional scanning of laser beams. In this step, the main controller 23 controls the optical scanner 15 via the mirror driving circuit 25 and supplies, to the laser driver 26, a drive signal(s) corresponding to a video signal input from an external device. Based on the drive signal from the main controller 23, the laser driver 26 controls the current value generated by the second current source 262 of each of the current source circuits 260R, 260G, and 260B. That is, the current value generated by the second current source 262 is modulated according to the luminance of the video signal.

Figure 6:
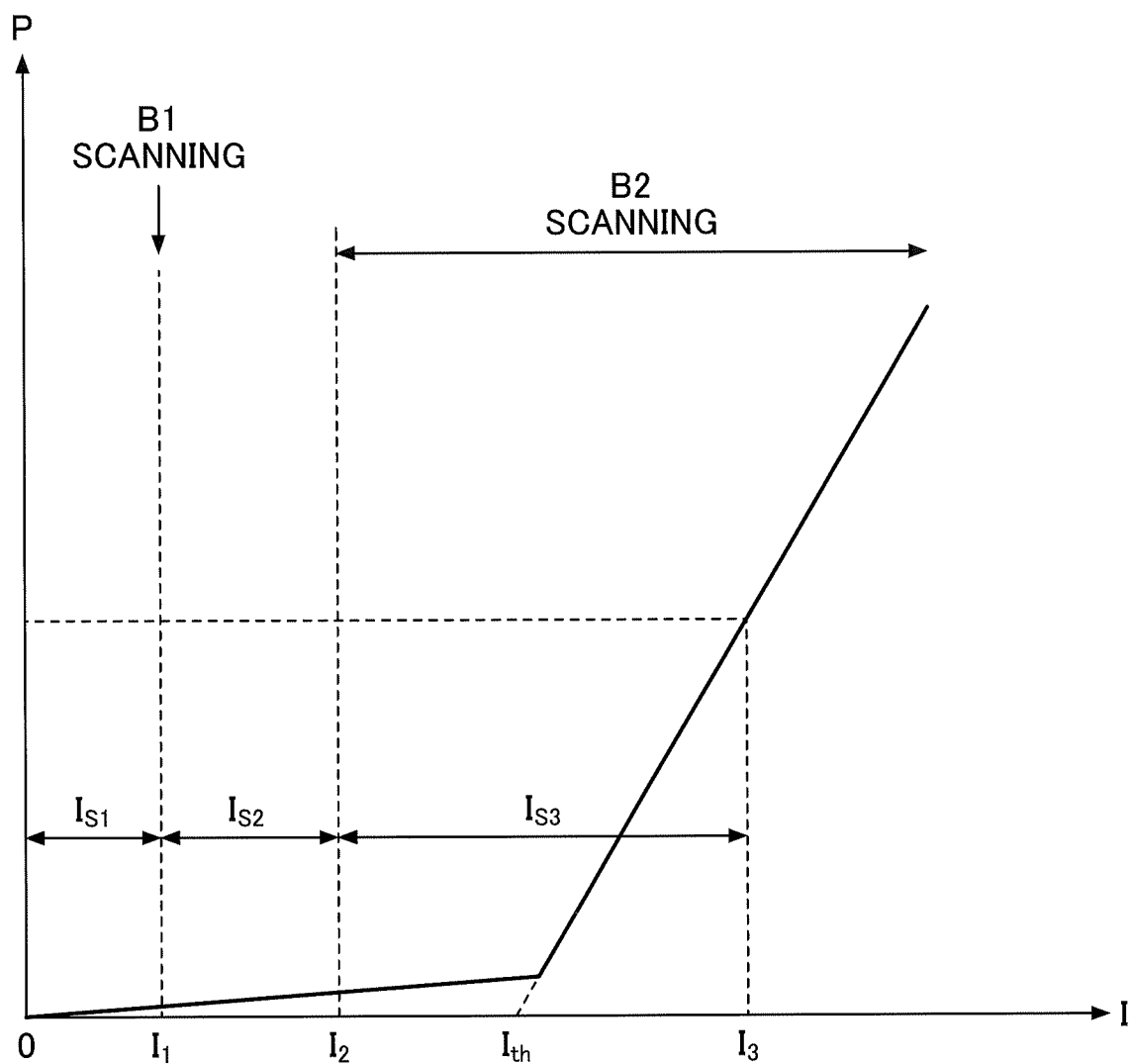
FIG. 6 is a graph illustrating a relationship between a drive current and an optical power of a laser device during two-dimensional scanning.

FIG. 6 is a graph illustrating a relationship between a drive current I and an optical power P of a laser device during two-dimensional scanning. The laser controller 27 sets the current value of the second current source 262 at zero because the value of a video signal is zero during a period for scanning the non-display area B1. That is, the laser driver 26 supplies only an electric current with the first drive current value $I_1$ generated by the first current source 261 to each laser device.

During a period for scanning the display area B2, the laser controller 27 causes the second current source 262 to generate an electric current with a value that is obtained by adding a third set current value $I_{S3}$ corresponding to the luminance of the video signal to the second set current value $I_{S2}$ described above. The third set current value $I_{S3}$ is a gradation current value indicating the luminance of the video signal. Even in the period for scanning the display area B2, the electric current with the first drive current value $I_1$ is output from the first current source 261.

Therefore, during a period where a portion of the display area B2 whose luminance level is not zero is scanned, an electric current with a third drive current value $I_3$, which is obtained by adding the gradation current value (the third set current value $I_{S3}$) to the second drive current value $I_2$, is supplied to each laser device. Here, the electric current supplied to the laser device to scan a portion of the display area B2 with a luminance level of zero has the second drive current value $I_2$.

The second drive current value $I_2$ and the third drive current value $I_3$ are represented by formulas (4) and (5) below.

$$I_2 = I_1 + I_{S2} \quad (4)$$

$$I_3 = I_2 + I_{S3} \quad (5)$$

Also, the second drive current value $I_2$ is within a range represented by formula (6) below.

$$I_1 \leq I_2 < I_{th} \quad (6)$$

Figure 7:
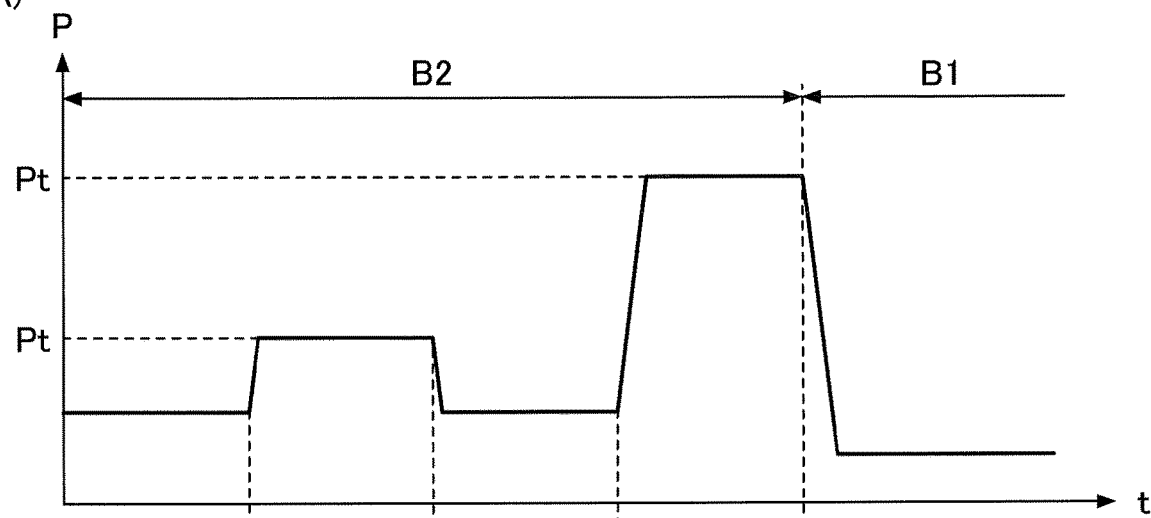
FIG. 7 is a graph illustrating examples of temporal changes in a drive current and an optical power during two-dimensional scanning.
Figure 7:
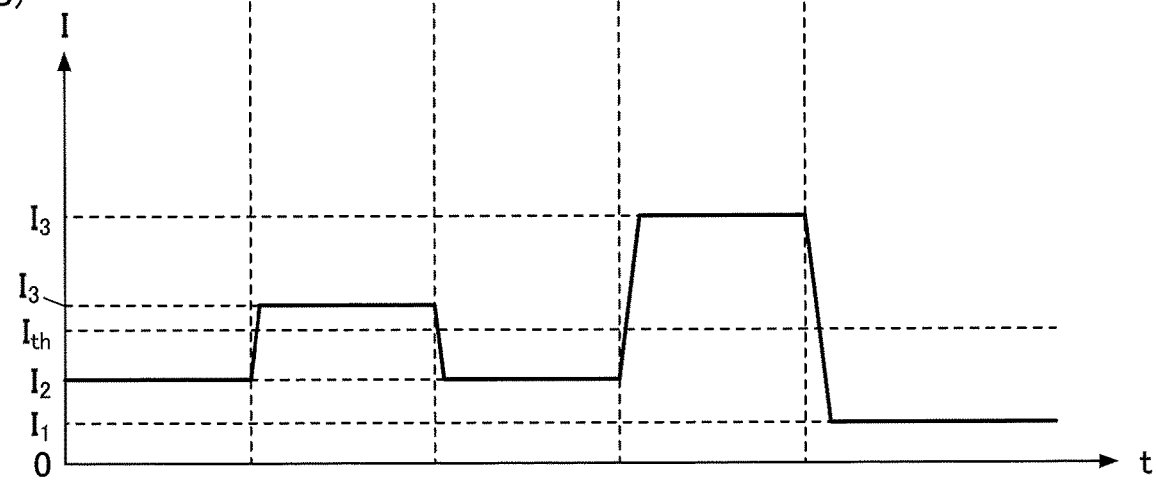

FIG. 7 is a graph illustrating examples of temporal changes in the drive current I and the optical power P during two-dimensional scanning. FIG. 7 (A) illustrates a relationship between the optical power P and time t. FIG. 7 (B) illustrates a relationship between the drive current I and time t.

As illustrated in FIG. 7 (B), in the present embodiment, the drive current I of the laser device changes across the threshold current value $I_{th}$ during a period for scanning the display area B2. However, in the present embodiment, because the second drive current value 12 for scanning a portion with a luminance level of zero is within a range represented by formula (6) above and is greater than the first drive current value $I_1$ for scanning the non-display area B1, the amount by which the drive current I changes across the threshold current value $I_{th}$ is small. This makes it possible to suppress an overshoot that may occur when the optical power P rises toward the target optical power value Pt corresponding to the third drive current value $I_3$. Suppressing the overshoot makes it possible to suppress granular noise that may occur around a dark portion in an image due to the overshoot.

In the above embodiment, the second drive current value $I_2$ is set at an average value of the first drive current value $I_1$ and the threshold current value $I_{th}$. However, the second drive current value $I_2$ may be set at any value that is greater than or equal to the first drive current value $I_1$ and less than the threshold current value $I_{th}$.

When the second drive current value $I_2$ is set at a value close to the first drive current value $I_1$, although the luminance of the dark portion decreases and the contrast increases, noise increases. On the other hand, when the second drive current value $I_2$ is set at a value close to the threshold current value $I_{th}$, although noise decreases, the luminance of the dark portion increases and the contrast is reduced. Thus, there is a trade-off between contrast and noise in relation to the setting of the second drive current value $I_2$. Therefore, it is preferable to set the second drive current value $I_2$ while checking contrast and noise in an actual image.

Also, in the above embodiment, the first drive current value $I_1$ is set at a value that is (1/n) times as large as the threshold current value $I_{th}$. However, the first drive current value $I_1$ is not limited to this example, and may be set at zero (i.e., $I_1 = 0$).

Second Embodiment

In the first embodiment, the second drive current value $I_2$ is set using the second set current value $I_{S2}$. However, the second drive current value $I_2$ may be set by offsetting a video signal without using the second set current value $I_{S2}$. In a second embodiment, a configuration and a method for setting the second drive current value $I_2$ by offsetting a video signal are described.

Figure 8:
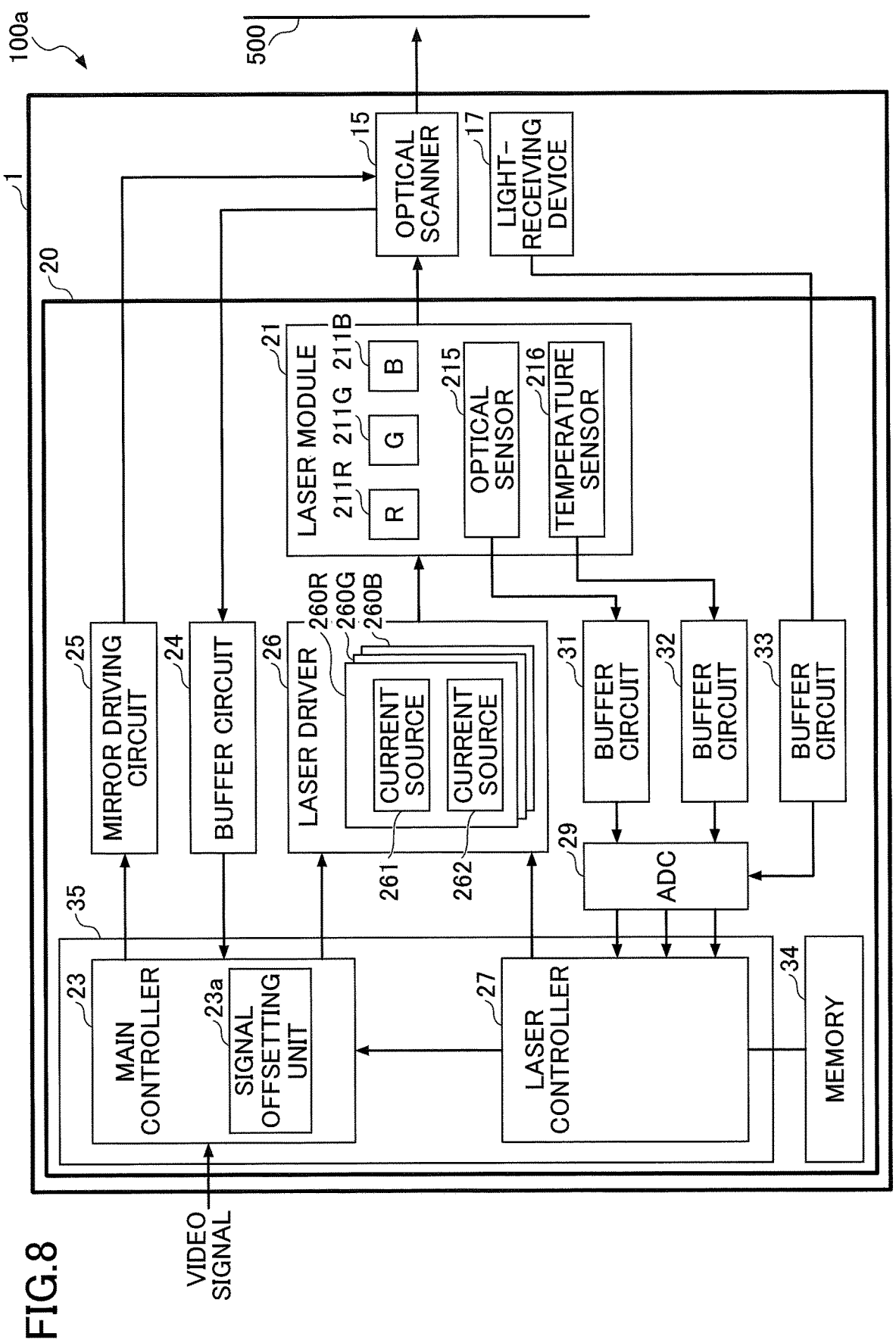
FIG. 8 is a drawing illustrating an example of a configuration of a display apparatus according to a second embodiment.

FIG. 8 is a drawing illustrating an example of a configuration of a display apparatus according to the second embodiment. A laser scanning display apparatus 100a illustrated in FIG. 4 is different from the display apparatus 100 of the first embodiment in that a signal offsetting unit 23a is added to the main controller 23.

In present embodiment, similarly to the first embodiment, the first current source 261 is configured to supply the first drive current value $I_1$ under control of the laser controller 27. On the other hand, the drive current value of the second current source 262 is determined based on an offset video signal supplied from the signal offsetting unit 23a.

Figure 9:
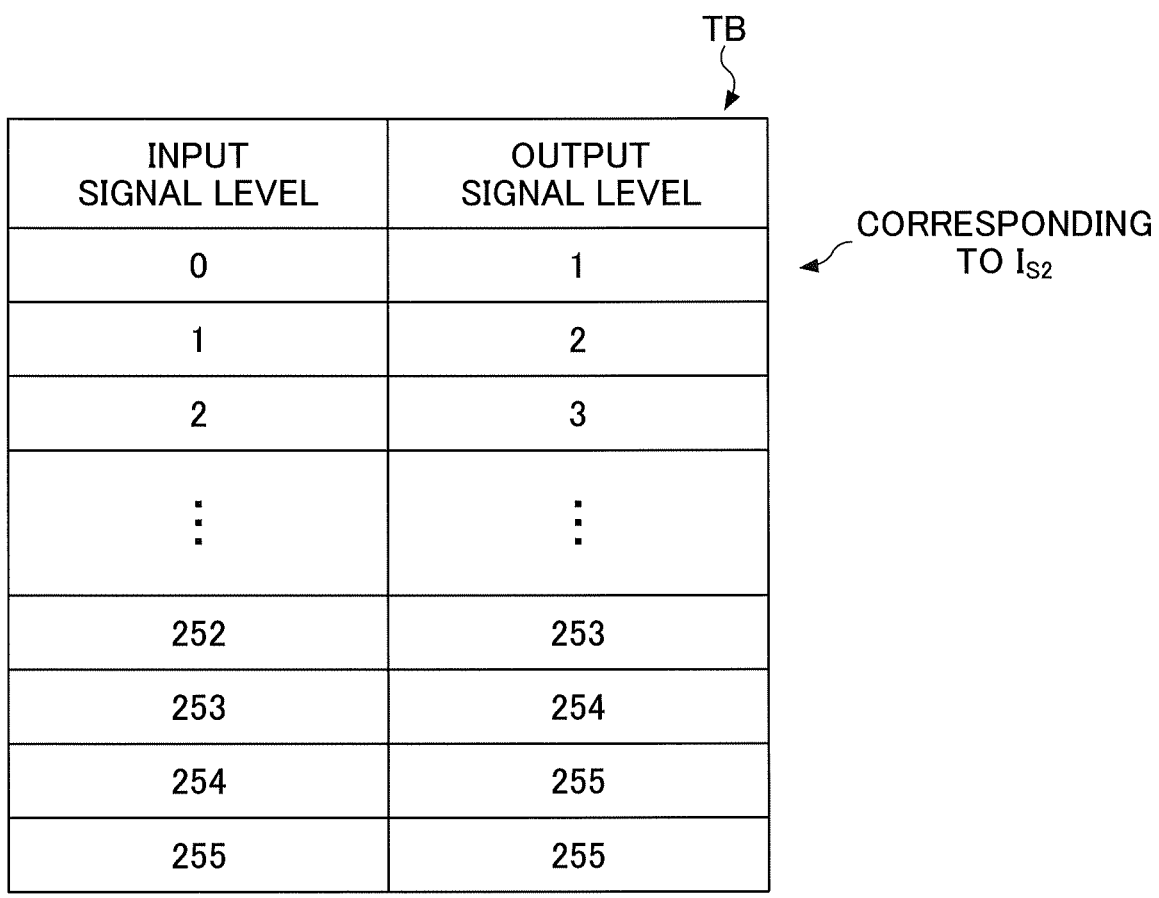
FIG. 9 is a drawing illustrating an example of a conversion table.

The signal offsetting unit 23a includes a conversion table for offsetting the signal level of a video signal input to the main controller 23. FIG. 9 is a drawing illustrating an example of the conversion table. A conversion table TB illustrated in FIG. 9 indicates a relationship between the input signal level of a video signal input to the signal offsetting unit 23a and the output signal level of an offset video signal output from the signal offsetting unit 23a.

In the example of FIG. 9, it is assumed that the video signal has 256 gradation levels, and the conversion table TB defines that a signal level corresponding to one gradation level is added as an offset value to the input signal level to obtain the output signal level. However, in the conversion table TB, if the offset output signal level exceeds the maximum gradation level (255), the output signal level is set at the maximum gradation level (255).

The signal offsetting unit 23a may also be configured to offset the video signal using a predetermined function instead of using the conversion table TB.

The main controller 23 offsets a video signal input from an external device using the signal offsetting unit 23a during the period for scanning the display area B2, and supplies a drive signal based on the offset video signal to the second current source 262. The second current source 262 adjusts a current value of a drive current based on the drive signal from the main controller 23, and supplies the drive current to the corresponding laser device.

In the second embodiment, the offset value used by the signal offsetting unit 23a corresponds to the second set current value $I_{S2}$ (see FIG. 6) in the first embodiment. That is, when the signal level of the video signal is zero, the electric current supplied to the laser device has the second drive current value $I_2$.

Also in the second embodiment, during the period for scanning the non-display area B1, because no video signal is input to the main controller 23, the electric current supplied to the laser device has the first drive current value $I_1$.

Similarly to the first embodiment, the second embodiment makes it possible to suppress overshoot, and thereby makes it possible to suppress granular noise that may be generated around a dark portion in an image due to the overshoot.

The offset value is not limited to the signal level described above that corresponds to one gradation level. Because the offset value determines the second drive current value $I_2$, it is preferable to set the offset value taking into account the trade-off between contrast and noise while checking an actual image as in the first embodiment.

The functions of the main controller 23 and the laser controller 27 may be implemented, for example, by executing a program stored in a computer-readable memory with a processor. The processor is, for example, a central processing unit (CPU). Also, each of the main controller 23 and the laser controller 27 may be implemented by a programmable logic circuit such as a field-programmable gate array (FPGA).

Further, the main controller 23 and the laser controller 27 may be implemented by one controller.

An aspect of this disclosure makes it possible to suppress noise in an image.

A control device, an optical scanning device, a display apparatus, and a control method according to the embodiments are described above. However, the present invention is not limited to the specifically disclosed embodiments, and variations and modifications may be made without departing from the scope of the present invention.

What is claimed is:

1. A control device for a laser scanning display apparatus, the control device comprising:
   a laser device;
   a current source that generates an electric current supplied to the laser device; and
   a controller that controls the current source to set a current value of the electric current supplied to the laser device, wherein
   during a period for scanning a non-display area where no image is displayed, the controller sets the current value at a first drive current value that is greater than zero and less than a threshold current value at which the laser device starts oscillating;
   during a period for scanning a portion with a luminance level of zero in a display area where an image is displayed, the controller sets the current value at a second drive current value that is greater than or equal to the first drive current value and less than the threshold current value;
   the current source includes a first current source and a second current source;
   the controller sets an electric current generated by the first current source at a first set current value that is "threshold current value×1/n (n is a number greater than one)" and sets an electric current generated by the second current source at a second set current value that is greater than the first set current value and less than "threshold current value×(1−1/n)"; and
   the first drive current value is the first set current value, and the second drive current value is a sum of the first set current value and the second set current value.

2. The control device as claimed in claim 1, wherein during a period for scanning a portion of the display area whose luminance level is not zero, the controller sets the current value at a third drive current value that is obtained by adding a gradation current value indicating luminance of a video signal to the second drive current value.

3. An optical scanning device, comprising:
   the control device as claimed in claim 1; and
   an optical scanner that scans a laser beam output from the laser device.

4. A display apparatus, comprising:
   the optical scanning device as claimed in claim 3; and
   an optical system that displays an image according to the laser beam scanned by the optical scanner.

5. A method for controlling a laser scanning display apparatus including a laser device and a current source that generates an electric current supplied to the laser device, the method comprising:
   setting a current value of the electric current at a first drive current value, which is greater than zero and less than a threshold current value at which the laser device starts oscillating, during a period for scanning a non-display area where no image is displayed; and setting the current value at a second drive current value, which is greater than or equal to the first drive current value and less than the threshold current value, during a period for scanning a portion with a luminance level of zero in a display area where an image is displayed, wherein the current source includes a first current source and a second current source;

an electric current generated by the first current source is set at a first set current value that is "threshold current value×1/n (n is a number greater than one)", and an electric current generated by the second current source is set at a second set current value that is greater than the first set current value and less than "threshold current value×(1−1/n)"; and the first drive current value is the first set current value, and the second drive current value is a sum of the first set current value and the second set current value.

* * * * *